(12) United States Patent
Plambeck-Fischer et al.

(10) Patent No.: US 6,680,109 B1
(45) Date of Patent: Jan. 20, 2004

(54) PYROGENICALLY PRODUCED ALUMINUM OXIDE

(75) Inventors: Peer Plambeck-Fischer, Rheinfelden (DE); Volker Hamm, Bad Säckingen (DE); Thomas Scharfe, Alzenau (DE); Helmut Mangold, Rodenbach (DE); Thomas Hennig, Gelnhausen (DE)

(73) Assignee: Degussa AG, Düsseldorf (DE)

( * ) Notice: Subject to any disclaimer, the term of this patent is extended or adjusted under 35 U.S.C. 154(b) by 17 days.

(21) Appl. No.: 09/656,736

(22) Filed: Sep. 7, 2000

(30) Foreign Application Priority Data

Sep. 10, 1999 (DE) .......................................... 199 43 291

(51) Int. Cl.⁷ ................................................ B32B 5/16
(52) U.S. Cl. ........................ 428/323; 428/328; 428/329; 428/402; 430/110
(58) Field of Search ................................ 428/323, 328, 428/329, 402; 430/110

(56) References Cited

U.S. PATENT DOCUMENTS 5,501,933 A * 3/1996 Deusser et al. ............. 430/110
5,607,806 A * 3/1997 Kanbayashi et al. ........ 430/110

FOREIGN PATENT DOCUMENTS

| JP | 54-24298 | 2/1979 |
| JP | 54-45698 | 4/1979 |
| JP | 31-153523 | 7/1991 |

OTHER PUBLICATIONS

Official Action (English– and German–language translations), dated Dec. 6, 2002, of the Japanese Patent Office, for Japanese Patent Application No. 2000–272066, 8 pages.

* cited by examiner

Primary Examiner—Leszek Kiliman
(74) Attorney, Agent, or Firm—Smith, Gambrell & Russell

(57) ABSTRACT

Pyrogenically produced aluminum oxide, in which the BET specific surface area is greater than 115 m²/g and the Sears index is over 8 ml/2 g and the dibutyl phthalate absorption as a powder measured with a 16 g weighed portion is not measurable, is produced by means of flame oxidation or preferably flame hydrolysis, whereby a vaporizable aluminum compound is used as starting material. The aluminum oxide can be used as an ink-absorbing substance in inkjet media and also as a filler, as a substrate, as a catalytically active substance, as a starting material for the production of dispersions, as a polishing material (CMP applications), as a ceramic raw material, in the electronics industry, in the cosmetics industry, as an additive in the silicone and rubber industry, to adjust the rheology of liquid systems, as a heat stabilizer, in the paint industry.

17 Claims, No Drawings

PYROGENICALLY PRODUCED ALUMINUM OXIDE

INTRODUCTION AND BACKGROUND

The present invention relates to a pyrogenically produced aluminum oxide, a method for its production and its use.

The paper industry requires readily dispersible fillers which absorb ink rapidly when used in inkjet paper or inkjet films and which help to give colors a high brilliance. The present invention concerns a specially produced aluminum oxide which, by virtue of its properties in corresponding coating slip formulations, is capable of reproducing inks applied by an inkjet printer onto these media containing this special aluminum oxide with very high brilliance and color fidelity.

It also concerns the utilization of this aluminum oxide in the manufacture of ink-receiving layers such as are conventional in inkjet media (e.g. paper, films, fabric, etc.).

SUMMARY OF THE INVENTION

The present invention provides a high surface area, pyrogenically produced aluminum oxide, characterised in that the BET specific surface area is greater than 115 $m^2/g$, and the Sears index is over 8 ml/2 g.

In an embodiment of the invention, the aluminum oxide is characterised in that the dibutyl phthalate absorption by the powder measured with a 16 g weighed portion is not measurable (no end-point detection).

The pyrogenically produced aluminum oxide according to the invention can be produced by means of flame oxidation or preferably flame hydrolysis, whereby a vaporizable aluminum compound, preferably chloride, is used as starting material. Such methods are known in the art.

The invention also provides for the use of the herein described aluminum oxide as an ink-absorbing substance in inkjet media.

The invention also provides for the use of the high surface area aluminum oxide herein described as a filler, as a substrate, as a catalytically active substance, as a starting material for the production of dispersions, as a polishing material (CMP applications), as a ceramic raw material, in the electronics industry, in the cosmetics industry, as an additive in the silicone and rubber industry, to adjust the rheology of liquid systems, as a heat stabilizer, in the paint industry.

DETAILED DESCRIPTION OF THE INVENTION

The pyrogenically produced aluminum oxide according to the invention as an ink-absorbing substance displays the following properties:

Good optical density and dot resolution, high ink absorption, rapid ink drying time, no bleeding (running together of inks), good water resistance after drying, no color shifts, no breakdown of inks after extended periods.

In comparison to known commercially available products (Aluminumoxid C and Aerosil MOX 170, both from Degussa-Hüls AG), the aluminum oxide according to the present invention exhibits very good properties for the manufacture of inkjet receiving layers, both alone and in combination with other fillers. It is characterised by enhanced brilliance and depth of color. These properties are of particular benefit in ink-receiving layers that are used for photographic quality reproduction. Weather resistance to water and light is also improved, which is advantageous for outdoor applications.

EXAMPLE 1

320 kg/h of previously vaporized aluminum trichloride ($AlCl_3$) are burned together with 100 $Nm^3/h$ hydrogen and 450 $Nm^3/h$ air in a burner of a known design.

After the flame reaction the fine-particle high surface area aluminum oxide is separated in a filter or cyclone from the hydrochloric acid gases generated at the same time, whereby any HCl traces still adhering are then removed by treatment with moist air at elevated temperature.

The high surface area pyrogenic aluminum oxide produced exhibits the physicochemical properties indicated in Table 1. Data for the commercially available pyrogenic aluminum oxide produced by Degussa-Hüls AG in Frankfurt am Main is also included in Table 1 for the purposes of comparison. (Trade name Aluminumoxid C).

TABLE 1

| | Unit | High surface area aluminum oxide according to the invention Alu 130 | Aluminum-oxid C |
| --- | --- | --- | --- |
| BET specific surface area | $m^2/g$ | 121 | 100 |
| Sears index (pH 4 to 9) | ml/2 g | 9.38 | 7.05 |
| PH | 4% aqueous dispersion | 4.93 | 4.5 |
| Loss on drying | wt. % | 3.3 | 3.0 |
| Bulk density | g/l | 55 | 48 |
| Compacted bulk density | g/l | 63 | 57 |
| DBP absorption | wt. % | not measurable, no end point can be determined. | 231 |

DBP: dibutyl phthalate

Measurement of the Sears index is described in EP 0 717 008 which is relied on and incorporated herein by reference.

EXAMPLE 2

Manufacture of the Coating Slip and Coating 30 parts by weight of polyvinyl alcohol Mowiol 28-99 (from the Clariant company), 80 parts by weight of Sipernat 310 (precipitated silicic acid, Degussa-Hüls AG) and in each case 20 parts by weight of the pyrogenically produced oxides described above are used. The solids content is adjusted to 18%. This aqueous dispersion is stirred for 30 min at 3000 rpm with a high-speed mixer. This coating slip is applied to a 70 $g/m^2$ base paper by means of a profiled doctor bar. The coating slip is dried with hot air. The rate of application in the dry state is 10 $g/m^2$.

| | Results | | |
| --- | --- | --- | --- |
| | Aerosil MOX 170 | Aluminuinoxid C | Alu 130 |
| Brilliance | Good | Good–very good | very good |
| Weather resistance | Satisfactory | Good | good–very good |

EXAMPLE 3

Manufacture of the Coating Slip 35 parts by weight of polyvinyl alcohol Mowiol 28-99 (Clariant) and in each case 100 parts by weight of the pyrogenically produced oxides described above are used. The solids content is adjusted to 15%. This dispersion is homogenized. This coating slip is applied to a 100 micrometer thick polyester film by means of a profiled doctor bar. The coating slip is dried with hot air. The wet film thickness is 120 micrometers.

| Results | | | |
|---|---|---|---|
|  | Aerosil MOX 170 | Alu C | Alu 130 |
| Adhesion to film | adequate–satisfactory | Good | good–very good |
| Brilliance | satisfactory | Good | good–very good |
| Weather resistance | satisfactory | Good | good–very good |
| Ink absorption | good–satisfactory | Good | very good |
| Gloss | good–satisfactory | Good–very good | very good |

EXAMPLE 4

Manufacture of the Coating Slip 70 parts by weight of polyvinyl alcohol Mowiol 5-88 (Clariant), 20 parts by weight of PVP/VA W-735 (polyvinyl pyrrolidone-polyvinyl acetate copolymer, from the ISP company), 10 parts of polyvinyl pyrrolidone K-30 (ISP) and in each case 50 parts by weight of the pyrogenically produced oxides described above are used.

The solids content is adjusted to 20%. The coating slip is applied by means of a profiled doctor bar to a 100 micrometer thick polyester film in a wet film thickness of 80 micrometers. The coating slip is dried with hot air.

| Results | | | |
|---|---|---|---|
|  | Aerosil MOX 170 | Alu C | Alu 130 |
| Brilliance | good | Good–very good | very good |
| Weather resistance | satisfactory–good | Good | good–very good |
| Transparency | satisfactory | Good | good–very good |
| Gloss | satisfactory–good | Good–very good | very good |

These results illustrate the advantages for the utilization of the aluminum oxide Alu 130 according to the invention.

EXAMPLE 5

For the purposes of comparison, Aluminumoxid C and MOX 170 (both Degussa-Hüls AG Frankfurt) were used in addition to the high surface area aluminum oxide 130 according to the invention.

Manufacture of the Coating Slip and Coating

Solution A is a 10 percent (relative to PVA) aqueous solution of polyvinyl alcohol (solid, abbreviation PVA) Mowiol 28-99 from Clariant.

Distilled water is added to this solution to form a solution B. Sipernat 310 (precipitated silicic acid, Degussa-Hüls AG) and each of the pyrogenically produced oxides are added to this solution B to form the coating slip C. This coating slip exhibits a mass ratio of 80 parts Sipernat 310 to 20 parts pyrogenic oxide to 30 parts PVA, relative to the solids. The total solids content is 18%.

The coating slip C is dispersed for 30 minutes at 3000 rpm in a high-speed mixer. The coating slip is then applied to a 70 g/m$^2$ base paper by means of a profiled doctor bar and dried with hot air. The rate of application in the dry state is 10 g/m$^2$.

The printing tests are performed on an Epson Stylus Color 800 at maximum resolution (1440*720 dpi).

| Results | | | |
|---|---|---|---|
|  | Aerosil MOX 170 | Alu C | high surface area aluminum oxide according to the invention |
| Color intensity | Good | Good–very good | very good |
| Color stability | Satisfactory | Good | good–very good |

EXAMPLE 6

Coating Slip Formulation

For the purposes of comparison, Aluminumoxid C and MOX 170 (both Degussa-Hüls AG Frankfurt) are used as additional oxides in addition to the high surface area aluminum oxide 130 according to the invention.

An aqueous dispersion is produced from these three different pyrogenic oxides using a rotor-stator system (Ultra-Turrax) for a dispersion period of 30 minutes in a double-walled vessel (with water cooling). A 25 percent dispersion (relative to the solid) (w=0.25) is produced containing a proportion by weight of 0.5% acetic acid.

Manufacture of the coating slip

Solution A is an 8 percent (relative to PVA) aqueous solution of polyvinyl alcohol (solid, abbreviation PVA) Mowiol 40-88 from Clariant.

This solution A is diluted with distilled water to produce a solution B. Each of the various metal oxide dispersions is added to solution B to form a coating slip C. The coating slip C exhibits a mass ratio of 100 parts pyrogenic oxide to 25 parts PVA, relative to the solid. The total solids content is 15%. This coating slip is applied by means of a profiled doctor bar to a 100 micrometer thick polyester film and dried with hot air. The wet film thickness is 120 micrometers.

It was not possible to manufacture an adhesive coating using Aerosil MOX 170.

For this mixed oxide the proportion had to be increased to a ratio of 100 parts Aerosil to 40 parts PVA, relative to the solids ratio.

| Results | | | |
|---|---|---|---|
|  | Aerosil MOX 170 | Alu C | High surface area aluminum oxide according to the invention |
| Adhesion to film | Adequate | Good | good–very good |
| Brilliance | Satisfactory | Good–very good | very good |
| Color stability | Satisfactory | Good–very good | very good |

-continued

| | Aerosil MOX 170 | Alu C | High surface area aluminum oxide according to the invention |
|---|---|---|---|
| Ink absorption | Very good | Good | good–very good |
| Gloss | Poor | Good–very good | very good |

EXAMPLE 7

Coating Slip Formulation

For the purposes of comparison, Aluminumoxid C and MOX 170 (both Degussa-Hüls AG Frankfurt) were used as additional oxides in addition to the high surface area aluminum oxide 130 according to the invention.

Solution A is a 20 percent (relative to PVA) aqueous solution of polyvinyl alcohol (solid, abbreviation PVA) 4-88 from the Clariant company.

Solution B is a 50 percent (relative to the copolymer) aqueous solution of a copolymer of vinyl pyrrolidone and vinyl acetate (abbreviation PVP/VA) W 735 from the ISP company.

Solution C is a 20 percent (relative to PVP) aqueous solution of polyvinyl pyrrolidone (abbreviation PVP) K–30 from ISP.

These three solutions are mixed in the above sequence and in the following ratio (70 parts by weight PVA: 20 parts PVP/VA: 10 parts PVP, relative to the solid) and diluted with water so that a coating slip with a total solids content of 20% is obtained by addition of 50 parts of each of the metal oxides. This dispersion is dispersed for 30 minutes at 10000 rpm in a suitable dispersion device such as an Ultra-Turrax apparatus from Janke & Kunkel company with a rotor-stator system. The coating slip is applied by means of a profiled doctor bar to a 100 micrometer thick polyester film in a wet film thickness of 80 micrometers and dried with hot air.

| | Aerosil MOX 170 | Alu C | high surface area aluminum oxide according to the invention |
|---|---|---|---|
| Brilliance | Good | good–very good | very good |
| Color stability | Satisfactory–good | Good | good–very good |
| Transparency | Satisfactory | Good | good–very good |
| Gloss | Satisfactory–good | good–very good | very good |

Advantages of the Present Invention

In comparison to the commercially available products (Aluminumoxid C and Aerosil MOX 170, both Degussa-Hüls AG) the aluminum oxide according to the invention exhibits very good properties in the manufacture of inkjet receiving layers both alone and in combination with other fillers. It is characterized by enhanced brilliance and depth of color. These properties are of particular benefit in ink-receiving layers that are used for photographic quality reproduction. It also demonstrates improved color stability in the presence of water and light, which is advantageous for outdoor applications.

Further variations and modifications will be apparent to those skilled in the art from the foregoing and are intended to be encompassed by the claim appended hereto.

German priority application 199 43 291.0 is relied on and incorporated herein by reference.

We claim:

1. A high surface area pyrogenically produced aluminum oxide, having a BET specific surface area greater than 115 $m^2/g$ and a Sears index of over 8 ml/2 g.

2. The pyrogenically produced aluminum oxide according to claim 1, wherein its dibutyl phthalate absorption of the aluminum oxide in the form of powder measured with a 16 g weighed portion is not measurable, with no end-point detection.

3. The pyrogenically produced aluminum oxide according to claim 1 which is produced by flame oxidation, or flame hydrolysis, whereby a vaporizable aluminum compound is used as starting material.

4. The pyrogenically produced aluminum oxide according to claim 2 produced by flame oxidation, or flame hydrolysis, whereby a vaporizable aluminum compound is used as starting material.

5. The pyrogenically produced aluminum oxide according to claim 4 produced by flame oxidation or flame hydrolysis, wherein the vaporizable aluminum compound is aluminum chloride.

6. An aqueous dispersion of the pyrogenically produced aluminum oxide according to claim 1.

7. An aqueous dispersion of the pyrogenically produced aluminum oxide according to claim 2.

8. The aqueous dispersion according to claim 6 which further comprises a member selected from the group consisting of polyvinyl alcohol, polyvinyl acetate, polyvinyl pyrrolidone and mixture thereof.

9. The aqueous dispersion according to claim 7 which further comprises a member selected from the group consisting of polyvinyl alcohol, polyvinyl acetate, polyvinyl pyrrolidone and mixture thereof.

10. The aqueous dispersion according to claim 6 which has a solids content of 15 to 25% by weight.

11. The aqueous dispersion according to claim 6 further comprising precipitated silica.

12. A substrate coated with the aqueous dispersion of claim 8.

13. The substrate according to claim 12 which is paper.

14. A process for preparing inkjet media comprising applying the aqueous dispersion of claim 6 onto a substrate and drying to obtain an inkjet media of good gloss.

15. A process for preparing inkjet media comprising applying the aqueous dispersion of claim 7 onto a substrate and drying to obtain an inkjet media of good gloss.

16. A process for preparing inkjet media comprising applying the aqueous dispersion of claim 8 onto a substrate and drying to obtain an inkjet media of good gloss.

17. A process for preparing inkjet media comprising applying the aqueous dispersion of claim 9 onto a substrate and drying to obtain an inkjet media of good gloss.

* * * * *